Sept. 22, 1942.  C. F. M. VAN BERKEL  2,296,587
SLICING MACHINE
Filed May 4, 1940
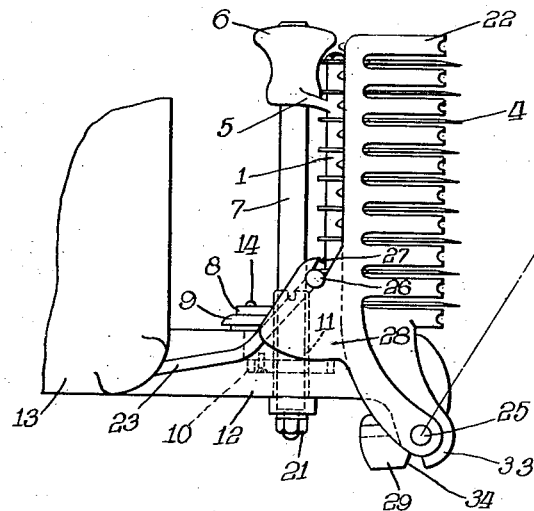
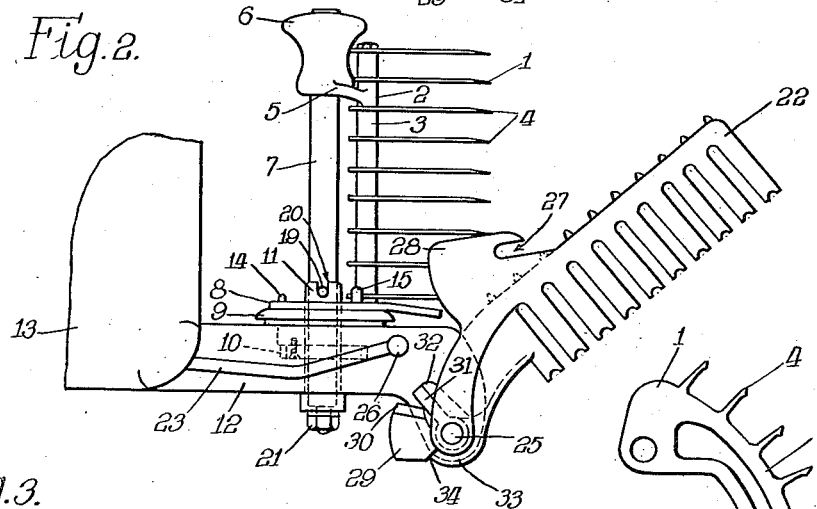
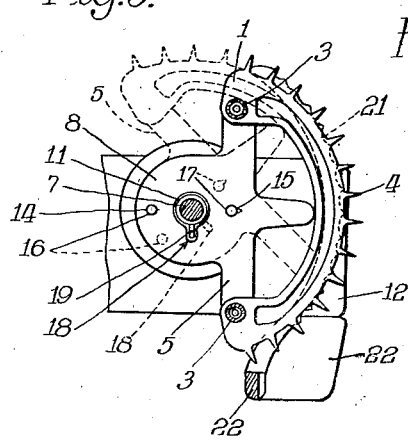
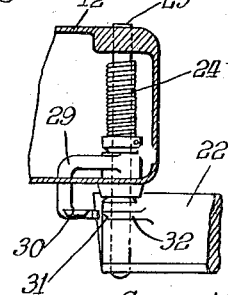
INVENTOR.
Cornelis F. M. van Berkel
BY John A. Marzall
ATTORNEY.

Patented Sept. 22, 1942

2,296,587

UNITED STATES PATENT OFFICE 2,296,587

SLICING MACHINE

Cornelis F. M. Van Berkel, Wassenaar, Netherlands, assignor to U. S. Slicing Machine Company, La Porte, Ind., a corporation of Indiana Application May 4, 1940, Serial No. 333,403
In Great Britain May 16, 1939

11 Claims. (Cl. 146—94)

This invention relates to slicing machines in general and particularly to slicing machines of the push-pull type, that is, slicing machines having a knife driven by an electric motor and a manually operated carriage which is reciprocated in a rectilinear path across the machine frame. More specifically, the invention relates to push-pull machines having a slice conveyor to convey slices from slicing position to discharge position and a discharge fly for removing the slice from the conveyor when the conveyor arrives at discharge position.

The primary object of the present invention is the provision of a slicing machine which is provided with slice stacking mechanism and including a conveyor and a discharge fly, the conveyor and fly being detachably mounted so that the same may be removed from its operating mechanism by a simple manipulation not involving the use of a tool.

Another object of the invention is to provide slice stacking mechanism comprising working components including a slice conveyor and a discharge fly, the said components being detachable by a simple manipulation not involving the use of a tool, so that the conveyor and the fly may be detached from its operating mechanism.

A further object of the invention is the provision of a slicing machine which is provided with stacking mechanism including a conveyor and a discharge fly, the said conveyor and fly being detachable from their mounting so that the parts may be instantly and readily removed for cleaning or other purposes.

A still further object of the invention is the provision of stacking mechanism comprising a rotary conveyor and a discharge fly, each being made detachable from its operating means and removable from the remainder of the mechanism, there being means provided to prevent accidental disengagement of the parts, but permitting free and easy dissociation of the parts.

Still another object of the invention is the provision of a conveyor rotatable on an axle and secured to a proper support, the axle being detachable from the support by a simple manipulation.

Numerous other objects and advantages will be apparent throughout the progress of the following specification.

The accompanying drawing illustrates a selected embodiment of the invention and the views therein are as follows:

Fig. 1 is a detail elevational view of slice stacking mechanism and embodying the invention, the view showing the discharge fly in its normal upright position;

Fig. 2 is a view similar to Fig. 1 but showing the discharge fly in a position removed from the conveyor and capable of being removed from its supporting members;

Fig. 3 is a detail plan view showing the mounting of the slice conveyor;

Fig. 4 is a detail sectional view showing the mounting of the discharge fly;

Fig. 5 is a detail plan view of a part of the conveyor, the impaling prongs being provided with spear-like heads.

The particular stacking mechanism herein shown for the purpose of illustrating the invention comprises a slice conveyor 1, which comprises a segmental portion 2 operatively supported by and carried by side pillars or supports 3. A plurality of slice engaging pins or impaling prongs 4 extend from the segmental or arcuate face 2 of the conveyor and are adapted to engage and impale slices as they are cut. A head 5, Fig. 1, is operatively connected to the conveyor and includes a knob portion 6 which is adapted to slidingly receive an upstanding pin or axle 7. A base 8 is also rigidly connected to the conveyor and this base is adapted to slide over the vertical axle or shaft 7. The entire assembly of the conveyor is a rigid one piece structure which is adapted to be removably mounted on the vertical shaft or axle 7. The conveyor base 8 is supported on a rotatable seat 9 to which there is secured a conveyor operating pinion 10. The pinion 10 is adapted to mesh with and be driven by a rack, not shown. The rack may be driven by any suitable mechanism so as to make it reciprocal, whereby the rotatable seat 9 will be giving oscillatory movement. The rack is operated in association with the usual substance supporting carriage and in synchronism therewith so that the impaling prongs 4 will move in harmony with the speed of the carriage, at least during the slicing stroke of the slicing machine. The seat 9 is journaled on a bush 11 and is borne by a bracket 12 in which the bush 11 is secured. The bracket 12 comprises the support for the slice stacking mechanism and is adapted to be secured to the frame 13 of the slicing machine. The seat 9 is provided with two upstanding positioning pins 14 and 15 which are adapted to engage holes or apertures 16 and 17 in the bottom supporting member or plate 8. A recess 18 formed in the base or plate 8 is registrable in one position only of the conveyor with a retaining pin 19 on the axle 7. The pin 19 on the axle 7 extends through a slot 20 in the bush 11. In Fig. 3, the conveyor is shown in full lines with the recess 18 registering with the pin 19. The conveyor is then freely withdrawable by simply lifting the conveyor from attachment with its driving means 9 and 10. In all other positions of the conveyor, the slot 18 is out of registration with the pin 19 and, therefore, the conveyor is prevented from being detached. One position in which the conveyor is out of registration with the slot and pin connection 18, 19 is shown in dotted lines in Fig. 3. When it is desired to remove the conveyor from its detachment, a simple manipulation only is involved. No tools will be necessary to permit such removal. All that is required is the mere manipulation of the parts to cause the proper registration whereby they may be instantly detached. The manipulation to cause the detachment does not involve an unscrewing operation such as would be required if one or more hand turnable nuts or equivalent screw parts were used to attach the conveyor in place.

The pin 19, by virtue of its location in the recess 20, serves to position the axle 7 in relation to the bracket 12 or frame 13.

The lower end of the axle 7 is preferably made screw threaded, and a hand turnable nut 21 serves to secure the axle rigidly to the bracket 12 or frame 13. On removal of the nut 21, the axle 7 can at once be withdrawn from the bracket simply by raising the axle therethrough.

A slice discharge fly 22 is adapted to be detachably connected to the bracket 12 and is arranged in juxtaposition with respect to the conveyor so that when the conveyor moves slices to discharge position, the fly will operate to remove the impaled slices from the conveyor and cause them to be stacked in a neat pile on a slice supporting tray.

The discharge fly 22 is operable under the control of a pull rod or link 23 against the action of a torsion spring 24, Fig. 4. The torsion spring 24 is positioned on the fixed pivot 25 of the fly and continuously tends to urge or force the fly to move in the direction of performance of its slice discharging operation.

The pull rod or link 23 is operated by fly controlling cam mechanism which is not shown in this application but which may be that shown and disclosed in applicant's Patent No. 2,277,279, dated March 24, 1942. The said cam mechanism may comprise a cam and cam pulling lever associated with a device which serves to absorb the shock of the fly at the end of each slice discharging operation.

The pull rod or link 23 has a roller or pin 26 which engages an open slot 27 in a lug 28 on the fly 22. The spring 24 is anchored at one end of the pivot 25 and is connected at its other end to a stirrup 29 which is freely journaled on the pivot to turn thereon towards a limiting position, Fig. 2. The stirrup 29 is formed with an inclined abutment face 30 which is engageable with a complementary inclined abutment face 31 of a projection 32 on the fly. The faces 30 and 31 are adapted to inter-engage when the roller 26 engages the slot 27, as shown in Fig. 1. In this latter position the spring 24 is acting on the stirrup 29 to press hard upon the projection 32 so that the faces coact to hold the fly fully home on the pivot. The arrangement is such that during operation of the machine at each instance when the drop of the cam is acting on the pull rod 23, the spring 24 forces the fly to perform a slice discharging operation. After the slice has been discharged, a cam forces the pull rod 23 to return the fly smoothly to its upright position against the yielding resistance of the spring 24.

The fly may be detached from its operating mechanism and rendered removable by the simple manipulation of the rod 23 by removing the roller 26 from the slot 27. When this disconnection is made, the spring 24 urges the fly to move in the same direction as when a slice discharging operation is performed. This latter movement, however, is continued until the parts assume the position in Fig. 2 wherein the projection 32 stands clear of the stirrup 29. In this latter position the stirrup 29 is in its upper limit. The downward movement of the fly is limited by a stop 33 thereon which engages a stop face 34 on the stirrup 29. When the fly 22 is in the position shown in Fig. 2, it is not only detached from its operating means, but is also freed from the interlocking action of the abutment faces 30 and 31. The fly, therefore, may be immediately removed from its pivot 25. The detachment and the removal of the fly, therefore, is accomplished by only a simple manipulation and all need for use of a tool or tools is obviated. When the fly is detached from the pull rod 23, the previously mentioned shock absorbing device associated with the fly controlling cam mechanism maintains the respective cam following lever clear of the cam so that the pull rod remains motionless. Therefore, when the main components 2, 7 and 22 of the slice stacking mechanism are removed, the machine is still operable for use in the conventional manner, whereby the slices may be removed by hand or otherwise.

The invention provides a slicing machine having associated therewith slice stacking mechanism comprising a rotary-mounted conveyor and a pivotally mounted discharge fly. The conveyor and the fly may be readily and easily removed by a simple manipulation not involving the use of tools. The parts, therefore, may be easily and quickly detached and disassembled for cleaning or otherwise. Moreover, the remaining stacking components may be removed entirely from the slicing machine without affecting the normal operation of the machine for cutting slices.

Changes may be made in the form, construction and arrangement of parts without departing from the spirit of the invention or sacrificing any of its advantages, and the right is hereby reserved to make all such changes as fairly fall within the scope of the following claims.

The invention is hereby claimed as follows:

1. A slicing machine comprising a support, slice stacking mechanism comprising a discharge fly and a conveyor operatively secured to said support, pivot means upon which the fly is mounted, means for operating the discharge fly and including interengaging abutments, said means being detachable, spring means to force the fly when released to perform the discharging operation, said abutments being engaged when said operating means is attached and disengaged upon detachment of the operating means, and said interengaging abutments having coacting means providing for holding the fly on said pivot means when engaged and for releasing the fly for removal from the pivot means when disengaged.

2. A slicing machine comprising a support, slice stacking mechanism comprising a discharge fly and a conveyor operatively secured to said support, a pivot upon which the fly is removably mounted, means for operating the discharge fly and comprising interengaging abutments, said means including disconnectible detachable members, spring means to force the fly when released to perform the discharging operation, said abutments being disengageable when the fly is detached from its operating means, said interengaging abutments coacting to hold the fly on its pivot, said interengaging abutments providing limit stops to limit the movement of the fly when detached from its operating means.

3. A slicing machine comprising a support, slice stacking mechanism comprising a discharge fly and a conveyor operatively secured to said support, a pivot upon which the fly is removably mounted, means for operating the discharge fly and comprising interengaging abutments, said means being detachable from the fly, spring means to force the fly when released to perform the discharging operation, said abutments being disengageable when the fly is detached from the first named operating means, said interengaging abutments coacting to hold the fly on its pivot, and an operating pull rod operatively connected to the fly, said fly being provided with a slot, and a roller on the rod removably receivable in the slot.

4. A slicing machine comprising a support, slice stacking mechanism including a discharge fly, means pivotally mounting said fly on said support, operating means for said fly including a member having disconnectible engagement with a part of the fly, cooperating means on said member and said fly for normally retaining the fly in predetermined position on said support, said cooperating means being disengaged upon disengagement of said member and fly, and said mounting means providing for free removal of the fly from the support by merely disconnecting said operating means.

5. A slicing machine comprising a support, slice stacking mechanism including a discharge fly, means pivotally mounting said fly on said support, operating means for said fly including a member having disconnectible engagement with a part of the fly, cooperating means on said member and said fly for normally retaining the fly in predetermined position on said support, means providing for disengaging said member from said fly by mere manipulation of the parts, said cooperating means being disengaged upon disengagement of said member and fly, and said mounting means providing for free removal of the fly from the support by merely disconnecting said operating means.

6. A slicing machine comprising a support, slice stacking mechanism including a discharge fly, means pivotally mounting said fly on said support, a first operating member having disconnectible engagement with a part of said fly, a second operating member having disconnectible engagement with a part of the fly, cooperating interengaging means on said second operating member and said fly for normally retaining the fly in predetermined position on said support, means providing for disconnecting said operating members by mere manipulation of the parts, and said mounting means providing for free removal of the fly from the support by merely disconnecting said operating members.

7. A slicing machine comprising a support, slice stacking mechanism including a discharge fly, means pivotally mounting said fly on said support, a first operating member having disconnectible engagement with a part of said fly, a second operating member having disconnectible engagement with a part of the fly, cooperating interengaging means on said second operating member and said fly for normally retaining the fly in predetermined position on said support, means including said first operating member for normally maintaining said interengaging means engaged and providing for disengagement thereof upon disconnection of the first member, and said mounting means providing for free removal of the fly from the support by merely disconnecting said operating members.

8. A slicing machine comprising a support, slice stacking mechanism including a discharge fly, means pivotally mounting said fly on said support, a first operating member having disconnectible engagement with a part of said fly, a second operating member having disconnectible engagement with a part of the fly, cooperating interengaging means on said second operating member and said fly for normally retaining the fly in predetermined position on said support, spring means operating upon said second operating member for moving said fly in a predetermined direction, means including said spring means and said first operating member for normally maintaining said interengaging means engaged, and means including a stop for said second operating member providing for disengagement of the interengaging means upon disconnection of said first member.

9. A slicing machine comprising a support, slice stacking mechanism including a discharge fly, means pivotally mounting said fly on said support, a first operating member having disconnectible engagement wtih a part of said fly, a second operating member having disconnectible engagement with a part of the fly, cooperating interengaging means on said second operating member and said fly for normally retaining the fly in predetermined position on said support, spring means operating upon said second operating member for moving said fly in a predetermined direction, means including said spring means and said first operating member for normally maintaining said interengaging means engaged, means including a stop for said second operating member providing for disengagement of the interengaging means upon disconnection of said first member, and said mounting means providing for free removal of the fly from the support by merely disconnecting said operating members.

10. A slicing machine comprising a support, slice stacking mechanism including a discharge fly, means pivotally mounting said fly on said support, a first operating member having a pin and open slot means for detachably connecting the member to a part of said fly, a second operating member having disconnectible engagement with a part of the fly, cooperating interengaging means on said second operating member and said fly for normally retaining the fly in predetermined position on said support, means including said first operating member for normally maintaining said interengaging means engaged, and means providing for disengagement of the interengaging means upon disconnection of said pin and slot connection to detach the first member, thereby to permit removal of said fly from said support.

11. A slicing machine comprising a support, a bushing secured to said support, a shaft removably mounted in said bushing, means normally retaining said shaft in said bushing, a laterally extending pin attached to said shaft, said bushing being provided with a slot for receiving said pin and maintaining the pin in predetermined angular position with respect to the bushing, a conveyor, means rotatably supporting said conveyor on said shaft including a member engageable under said pin, said pin and said member normally cooperating to retain the conveyor on the shaft, and said member being provided with a slot slidable over said pin to permit removal of the conveyor when the conveyor is rotated to a predetermined position.

CORNELIS F. M. VAN BERKEL.